July 26, 1932.  R. H. CHILTON  1,869,132

SPRING SHACKLE

Filed Jan. 27, 1927

Ralph H. Chilton Inventor

By Spencer Hardman & Fehr his Attorneys

Patented July 26, 1932

1,869,132

UNITED STATES PATENT OFFICE

RALPH H. CHILTON, OF DAYTON, OHIO, ASSIGNOR TO THE INLAND MANUFACTURING COMPANY, OF DAYTON, OHIO, A CORPORATION OF DELAWARE

SPRING SHACKLE

Application filed January 27, 1927. Serial No. 163,933.

This invention relates to coupling members, especially such as are used as spring shackles on vehicles.

An object of this invention is to provide an improved form of spring shackle, having elastic rubber therein between the relatively movable metal parts, which will be efficient and of long life in use and which may be economically manufactured.

One feature of this invention is the large bearing area upon the elastic rubber. Another feature is the tortuous distortion of the elastic rubber under the initial compression thereof, whereby the additional distortion due to the weight load upon the shackle is minimized.

Further objects and advantages of the present invention will be apparent from the following description, reference being had to the accompanying drawing wherein a preferred embodiment of one form of the present invention is clearly shown.

In the drawing.

Similar reference characters refer to similar parts throughout the drawing.

Figure 1:
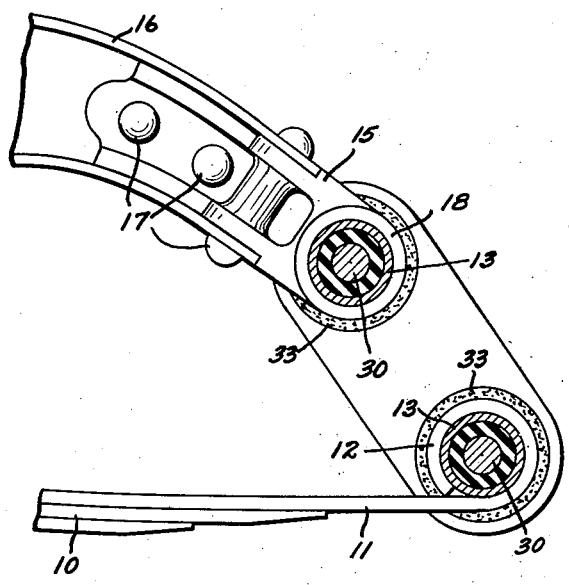
Fig. 1 is a view on line 1—1 of Fig. 2 and shows an extension shackle made according to this invention, connecting the rear end of the rear spring of an automobile to the end of the chassis frame.

Numeral 10 designates the automobile rear semi-elliptic spring, the long leaf 11 thereof having the eye 12 rolled therein. The metal sleeve 13 is held rigid in eye 12, preferably by a pressed fit, and projects laterally on both sides beyond the eye a sufficient distance to give the desired bearing area upon the elastic rubber. Of course the weight or thickness of metal of sleeve 13 should be such as to withstand the bending load on the projecting ends 14 thereof. If these ends 14 project only a short distance on each side,—say one quarter inch,—the thickness of metal of the sleeve 13 may be much less than if they projected three quarters of an inch.

The downwardly curved horn 15 is rigidly fixed to the chassis side rail 16 by rivets 17, or other suitable means. This horn 15 is also provided with an eye 18, into which is fixed, preferably by pressed fit, a second metal sleeve 13 which is aligned parallel with the first described sleeve 13. Or, if desired, the upper metal sleeve 13 may be made integral with the fitting 15.

Figure 2:
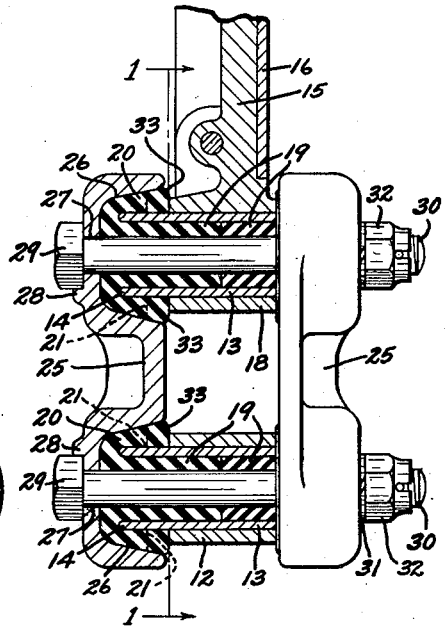
Fig. 2 shows in part a mid-section through the shackle and in part an end elevation thereof.
Figure 3:
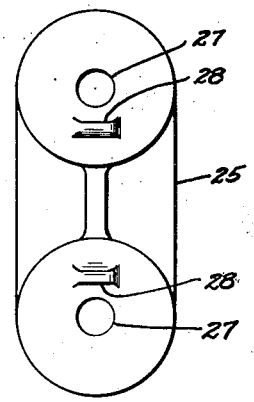
Fig. 3 is a detail view showing the outer side of the left side link of Fig. 2.
Figure 4:
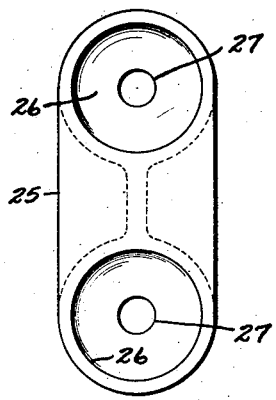
Fig. 4 is similar to Fig. 3, but shows the inner side of the side link.

Two separately molded elastic rubber blocks 19, of the form approximately shown in Fig. 2, are slipped into the opposing ends of each sleeve 13 until they abut at the center thereof. Each rubber block 19 has an enlarged head portion 20 which extends around on the outside of and encases the projecting ends 14 of sleeve 13. In other words, the enlarged ends of blocks 19 are molded with annular recesses therein into which the projecting ends 14 slip when the blocks 19 are inserted in the sleeves 13. In their original or non-distorted form the portions 20 terminate approximately at the dotted lines 21 of Fig. 2 and the blocks 19 project laterally slightly further than as shown in Fig. 2.

The two side links 25 have cup-shaped recesses 26 at their end portions which snugly receive the enlarged heads 20 of the rubber blocks 19 when they are placed laterally thereupon before the rubber has been compressed or distorted to the form shown in Fig. 2. The bolts 30 are next inserted through holes 27 in the side links 25 and through the central apertures in the rubber bushings 19, and the lock washers 31 and nuts 32 applied to the projecting threaded ends thereof. Now when the nuts 32 are set up tight, the side links 25 are forced toward each other, thus putting the elastic rubber under high compression and forcing it into tight non-slipping surface engagement with its contacting metal surfaces. Also the enlarged heads 20 of the elastic rubber blocks 19 are compressed laterally, causing the elastic rubber to flow and completely fill the annular crevices between the ends 14 of sleeve 13 and the recesses 26 of side links 25 and to bulge out as shown at 33 in Fig. 2. It is thus seen that there are no crevices left wherein mud, dirt, etc. may find lodgement and finally work down between the rubber and metal and cause rapid deterioration of the rubber.

It is also seen that, since the rubber has been distorted from the dotted lines 21 in Fig. 2 to the full lines 33 shown therein by this initial compression, there will be small tendency for the elastic rubber to bulge out further at the points 33 when the load of the car body comes upon the shackle. The elastic rubber will already have been materially extended by distortion at these points and therefore will inherently resist further extension when the load comes upon the shackle.

It will be obvious that the bearing area upon the elastic rubber is greatly increased by having the portions 20 thereof extending around on the outside of the projecting ends 14 of sleeve 13. Preferably the enlarged head portion 20 is made of a slightly different rubber compound from the central portion of the rubber block 19, so that during vulcanization of the block 19, the central portion will be vulcanized to a somewhat harder elastic rubber than the portion 20. This is advantageous because when the side links swing, due to deflection of spring 10, the internal distortion of the central portion of the block 19 will not be as large as that in the portion 20, due to the greater diameter of the latter portion.

Side sway or lateral movement of the chassis frame relative to the spring 10 is positively prevented by the rubber blocks 19 abutting the lateral surfaces of the eyes 12 and 18 and the ends of the sleeves 13. In other words, the rubber blocks 19 resist any lateral movement of the side links 25 by a direct compression of the rubber rather than by depending entirely upon the bond between the elastic rubber and the retaining metal sleeve 13.

The bolts 30 are non-rotatably fixed to the side links 25 by any suitable means. In Fig. 2 the left link 25 is shown as having lugs 28 which engage flats on the bolt heads 29, thus preventing relative rotation of the bolt. At the opposite ends of the bolts 30, the lock washers 31 aid in preventing relative rotation of the bolts to the right side link 25. It is to be understood that all the surfaces of the elastic rubber are forced into tight non-slipping contact with the contacting metal parts and the relative pivoting is permitted by internal distortion or twist in the elastic rubber.

While the form of embodiment of the present invention as herein disclosed, constitutes a preferred form, it is to be understood that other forms might be adopted, all coming within the scope of the claims which follow.

What is claimed is as follows:

1. In combination with the spring and frame member of a vehicle, a shackle interconnecting said members comprising: metal sleeves fixed to the spring and frame respectively and having laterally projecting ends, two elastic rubber bushings inserted into each of said sleeves from opposite ends thereof, said bushings having enlarged heads which enclose the projecting ends of said sleeves, metal side links having end recesses receiving said enlarged heads, and pivot pins extending through said bushings and clamping said side links together, whereby said rubber bushings are compressed.

2. An extension shackle interposed between a spring and a relatively movable member, comprising: two transverse metal sleeves rigid with the spring and member respectively, elastic rubber bushings within said sleeves and having enlarged heads projecting beyond and encasing the ends of said metal sleeves, two side links having end recesses encasing and confining said enlarged heads under compression, and pins extending through said bushings and non-rotatably secured to said side links.

3. An extension shackle interposed between a spring and a relatively movable member, comprising: two transverse metal sleeves rigid with the spring and member respectively, elastic rubber bushings within said sleeves and having enlarged heads projecting beyond and encasing the ends of said metal sleeves, two side links having end recesses encasing and confining said enlarged heads under compression, and two bolts extending through said side links and bushings, and having nuts threaded thereon for clamping said side links together to compress the rubber.

4. A pivot connection between two relatively movable parts comprising: an eye member rigid with one of said parts, a metal sleeve held therein and projecting laterally beyond said eye member, an elastic rubber bushing within said sleeve having enlarged heads projecting beyond and encasing the ends of said sleeve, metal cups attached to the other of said movable parts and encasing and confining said enlarged heads under compression, and an isolated pin extending through said rubber bushing and non-rotatably secured to said metal cups.

5. A pivot connection between two relatively movable parts comprising: an eye member rigid with one of said parts, a metal sleeve held therein and projecting laterally beyond said eye member, an elastic rubber bushing within said sleeve having enlarged heads projecting beyond and encasing the ends of said sleeve, housing members attached to the other relatively movable part and confining said enlarged heads under compression, and a pivot pin extending through said rubber bushing and non-rotatably secured to said housing members.

6. A pivot connection between two relatively movable parts comprising: an eye member rigid with one of said parts, a metal sleeve held therein and projecting laterally beyond said eye member, an elastic rubber bushing within said sleeve having enlarged heads projecting beyond and encasing the ends of said sleeve, housing members attached to the other relatively movable part and confining said enlarged heads under compression, and a bolt extending through said rubber bushing and housing members and having a nut threaded thereon for clamping said housing members together to compress the rubber.

7. A pivot connection between two relatively movable parts comprising: a hollow laterally projecting member rigid with one of said parts, relatively harder elastic non-metallic material within said hollow member, relatively softer elastic non-metallic material surrounding and encasing the end portions of said hollow member, and housing members attached to the other relatively movable part and forced laterally upon and confining said elastic material under compression.

8. A pivot connection between two relatively movable parts comprising: a hollow laterally projecting member rigid with one of said parts, elastic rubber material within said hollow member, elastic rubber material encasing the end portions of said hollow member, housing members attached to the other relatively movable part and confining said elastic rubber under compression, the rubber exterior of said hollow member being of a softer more yieldable grade than that within said hollow member.

In testimony whereof I hereto affix my signature.

RALPH H. CHILTON.